United States Patent [19]

Dombro

[11] 4,378,304

[45] Mar. 29, 1983

[54] CATALYST AND METHODS

[75] Inventor: Robert A. Dombro, Clinton, Iowa

[73] Assignee: Chemplex Company, Rolling Meadows, Ill.

[21] Appl. No.: 270,004

[22] Filed: Jun. 3, 1981

[51] Int. Cl.³ .............................................. C08F 4/64
[52] U.S. Cl. ................................ 252/429 B; 526/138; 526/142
[58] Field of Search ..................................... 252/429 B

[56] References Cited

U.S. PATENT DOCUMENTS

| | | | |
|---|---|---|---|
| 2,981,725 | 4/1961 | Luft et al. ........................... 260/93.7 |
| 3,642,746 | 2/1972 | Kashiwa et al. ............ 252/429 B X |
| 3,738,944 | 6/1973 | Candlin et al. ............. 252/429 B X |
| 3,784,481 | 1/1974 | Lassau et al. ............... 252/429 C X |
| 4,082,692 | 4/1978 | Goldie ............................ 252/429 B |
| 4,087,380 | 5/1978 | Hyde et al. ....................... 252/429 B |
| 4,105,585 | 8/1978 | Matheson ........................ 252/429 B |
| 4,170,568 | 10/1979 | Kirkwood ........................... 252/430 |
| 4,173,547 | 11/1979 | Graff ............................... 252/429 B |
| 4,223,117 | 9/1980 | Sand et al. .................. 252/429 B X |

FOREIGN PATENT DOCUMENTS 2523165 11/1975 Fed. Rep. of Germany.
2406643 5/1979 France.

*Primary Examiner*—Patrick Garvin
*Attorney, Agent, or Firm*—Wegner, McCord, Wood & Dalton

[57] ABSTRACT

A catalyst, a method of preparing a catalyst and method of polymerizing olefins with the catalyst in which the catalyst is prepared by reacting a support with a Group IIA organometallic compound essentially free of aluminum alkyls and reacting this product with water or a hydrocarbyl alcohol, then reacting this product with, for example, titanium tetrachloride, followed if necessary by removing unreacted ingredients and finally activating by contacting with a cocatalyst in the absence of oxygen and moisture.

44 Claims, No Drawings

CATALYST AND METHODS

BACKGROUND OF THE INVENTION

Catalysts for polymerizing and copolymerizing olefins have been known and are widely used in industry. The catalysts of this invention have many superior properties over prior catalysts in that they are adaptable to low pressure, vapor phase, solution form or, most importantly, particle form processes of polymerizing. When used in a continuous particle form ethylene polymerization process, these catalysts display excellent melt index control of resulting polymers and copolymers because of their extraordinary sensitivity to hydrogen.

This extraordinary sensitivity to hydrogen can in part be achieved by adjusting the concentrations of catalyst components on the support while maintaining a constant molar ratio between them. As a result, polymers and copolymers can be produced within a preselected melt index range.

The most important prior art of which Applicant is aware is U.S. Pat. No. 2,981,725 which describes the use of silica as a finely divided support for Ziegler-type catalyst compounds.

Another U.S. Pat. No. is 4,173,547 which discloses the use of alumina and silica as such a support.

French Demande No. 2,406,643 discloses a polyethylene catalyst comprising a reaction product of dibutylmagnesium, ethylaluminum sesquichloride and tetraisopropyl titanate.

U.S. Pat. No. 4,173,547 discloses the use of a dibutylmagnesium with alumina or silica in a polymerization catalyst.

German Offen. No. 2,523,165 discloses a catalyst prepared by the reaction of a dibutylmagnesium/triethylaluminum complex with n-octanol to form another complex which is treated with titanium tetrachloride.

U.S. Pat. No. 3,642,746 discloses complexing of anhydrous metal halides with alcohols prior to reaction with titanium tetrachloride. The resulting catalysts are used for α-olefin polymerization.

U.S. Pat. No. 4,170,567 discloses the reaction product of titanium tetrachloride with an alcohol which then is reacted with a magnesia to provide a polymerization catalyst.

U.S. Pat. No. 4,105,585 discloses a process for making a Ziegler catalyst by reacting magnesium metal and a halogen-containing titanium compound in the presence of an alcohol.

U.S. Pat. No. 4,087,380 is similar to U.S. Pat. No. 4,105,585 except that the components are deposited on magnesia.

SUMMARY OF THE INVENTION

When used in a particle form process for the polymerization of ethylene, the catalyst, in conjunction with a cocatalyst and hydrogen, displays exceptional resin melt index control and is capable of producing resins with a wide melt index range from fractional high load to 50 g/10 minutes or more at unpredicted and surprisingly excellent productivity and with resin particle size and form with minimal fines. An extrudate of this resin displays low brittleness and good flexibility.

Resins of this type are particularly useful for injection molding or as a blending component with high molecular weight polyethylene for applications such as film, etc.

This invention relates to improved supported type catalysts for the polymerization of α-olefins, especially ethylene. The catalyst is made by reacting in sequence: (1) a porous support with a Group IIA organometallic compound; (2) the composite from (1) with water or a hydrocarbyl alcohol; (3) reacting the product from (2) with a Group IVB and/or VB transition metal compound and/or compounds. The solid catalyst obtained is activated with a cocatalyst selected from a Group IA, IIA, IIIA and/or IIB organometallic compound including hydrogen. Activation may take place outside or within the polymerization reactor.

The porous support is selected from the group consisting of alumina, silica, magnesia, zirconia, or combinations of these such as a zirconia-silica xerocogel. The preferred support is alumina or silica. The alumina may be calcined at 1000°–1800° F., preferably 1500° F.; silica preferably at 1100°–1300° F.

The Group IIA organometallic compounds are essentially free of aluminum alkyls and are represented by the general formula $MR_2$, where M may be beryllium, magnesium, calcium, strontium or barium, and R is hydrogen or a hydrocarbyl radical. The preferred compounds are dialkylmagnesiums such as dimethylmagnesium, ethyl-n-butylmagnesium, n-butyl-s-butylmagnesium or di-n-hexylmagnesium. The dialkylmagnesium compound is first reacted with the porous supports at a concentration less than, equal to, or greater than the calcined support's surface hydroxyl concentration within the following limits:

for silica, the molar ratio of dialkylmagnesium to the surface hydroxyls is in the range from 0.25 to 1 up to 3.0 to 1 but preferably from 0.5 to 1 up to 2.5 to 1; for alumina, the molar ratio of dialkylmagnesium to the surface hydroxyls is in the range from 0.5 to 1 up to 2.0 to 1 but preferably from 0.8 to 1 up to 1.2 to 1. The reaction is normally, but not necessarily, conducted in a hydrocarbon slurry at temperatures from ambient to about 150° C., but usually at 90°–100° C.

The hydrocarbyl alcohol is represented by the formula, ROH, where R is a $C_1$ to $C_{20}$ alkyl, aryl, alkaryl, or aralkyl radical. Suitable alcohols are methanol, isopropanol, 1-butanol, 2-methyl-1-pentanol, mixtures of linear primary alcohols such as 1-dodecanol, 1-tetradecanol, and 1-hexadecanol. In addition, cyclic alcohols such as cyclobutanol, 1-adamantanol, etc.; aromatic hydroxy compounds such as benzyl alcohol.

The Group IIA organometallic-treated porous support is normally treated with the alcohol at elevated temperatures, usually 90°–100° C., usually, but not necessarily, in a hydrocarbon slurry. The molar ratio of the hydrocarbyl alcohol to the alkylmagnesium on the porous support is critical and is in the range from 0.5 to 1 up to 4 to 1 but preferably from 0.8 to 1 up to 1 to 1. When the molar ratio of hydrocarbyl alcohol to alkylmagnesium is varied to as high as 3 to 1, the molar concentration of the transition metal compound must be equal to or greater than the molar concentration of hydrocarbyl alcohol but preferably in a 1:1 molar ratio.

Excess hydrocarbyl alcohol, if any, should not be removed from the composite prior to reaction with the transition metal compound. Indeed, if it is removed, reactivity of the catalyst is reduced.

Group IVB or VB transition metal compounds are halides or oxyhalides of these metals, the preferred compound being titanium tetrachloride. It is reacted with the composite containing the alkylmagnesium compound in a molar ratio of transition metal compound to alkylmagnesium compound in the range from 0.5 to 1 up to 4 to 1, but preferably from 0.8 to 1 up to 1:1. The reaction usually takes place in a hydrocarbon slurry at temperatures in the range 90°–150° C., especially in the range, 90°–135° C. The Group IVB and/or VB transition metal compound may also be used neat, in which case the desirable reaction temperature is usually about 135° C.

Finally, all unreacted components and by-products are removed if necessary by dry hydrocarbon washing or by dry inert gas fluidization at temperatures up to about 150° C. but preferably at temperatures below 100° C.

Activation of the solid catalyst takes place in the essential absence of oxygen with a cocatalyst selected from the Group IA, IIA, IIIA, and/or IIB organometallic compounds including hydrogen. Examples are n-butyllithium, diethylmagnesium, triisobutylaluminum, diethylaluminum chloride, diethylzinc, etc. The molar ratio of the cocatalyst to the Group IVB and VB transition metal can be from 0.1:1 to 10:1, preferably about 3:1.

Polymerization of ethylene took place under two sets of conditions, each using triisobutylaluminum as cocatalyst. Pressure bottle (PB) conditions are 500 cc n-heptane as diluent, 35 psig ethylene added on demand and at about 140° F. Particle form (PF) conditions are 2900 cc isobutane as diluent, 550 psig total pressure with ethylene, and at 220° F. The abbreviation BEM stands for ethyl-n-butylmagnesium.

DESCRIPTION OF THE PREFERRED EMBODIMENTS

All catalyst data presented in Examples 1 through 39 are presented in the Table.

Comparative Examples 1 to 4 inclusive show that the absence of a dialkylmagnesium compound and a hydrocarbyl alcohol or the absence of a hydrocarbyl alcohol, or the absence of a dialkylmagnesium compound gives rise to catalysts with poor activity.

EXAMPLE 1

Under $N_2$, 10 g of silica calcined at 1300° F. (surface area, 300 m$^2$/g; $N_2$ pore volume, 1.7 cc/g) was mixed with 50 cc TiCl$_4$. The mixture was stirred and heated for one hour at 125°–130° C. The product was then collected under $N_2$, washed with pure n-hexane and dried. The final dry product contained 3.5 wt.% titanium. Ethylene polymerization under PB conditions showed poor activity at 20 g/g cat/hr.

EXAMPLE 2

A similar catalyst was prepared as described in Example 1 except alumina calcined at 1300° F. (surface hydroxyl concentration, 0.96 mmoles/g; surface area, 371 m$^2$/g; H$_2$O pore volume, 1.8 cc/g) was used in place of silica. A product containing 3.9 wt.% titanium was obtained. Although the reactivity of this catalyst was four times greater than the corresponding catalyst based on silica, its activity was still considered low at 87 g/g cat/hr under PB (Pressure Bottle) conditions.

EXAMPLE 3

Under $N_2$, 20 g of alumina calcined at 1500° F. was mixed with 120 cc pure n-heptane. Twenty-nine cc of a 10 wt.% solution of BEM in n-heptane was then added. The mixture was stirred and heated under reflux for one hour. Without cooling, 1.8 cc of TiCl$_4$ was added and the mixture heated for an additional hour. The product was collected, washed with n-hexane, and dried under $N_2$. Analysis showed 2.8 wt.% titanium. Under PB conditions, activity was poor at 65 g/g cat/hr.

EXAMPLE 4

A catalyst prepared with 1500° F. alumina in the usual manner with 1-butanol and TiCl$_4$ but without a dialkylmagnesium compound showed no activity.

Invention Examples 5 to 11 inclusive cover the support type. Results show that a variety of silicas and aluminas can be used. Examples 5, 8, 9, 10 and 11 represent catalysts prepared with preferred concentrations and ratios of components. Example 11 shows that no additional hydrocarbon diluent is necessary during preparation.

EXAMPLE 5

Under $N_2$, 20 g of silica calcined at 1100° F. (surface area 300 m$^2$/g; $N_2$ pore volume, 1.7 cc/g) was mixed with 120 cc pure n-heptane. With stirring, 71 cc of 10 wt.% solution of BEM in n-heptane was added. The mixture was heated at 90°–100° C. for one hour.

Without cooling, 3.7 cc of 1-butanol was added to the mixture. Heating continued for an additional quarter hour at 90°–100° C. Again without cooling, 4.4 cc of TiCl$_4$ was added. Heating continued at 90°–100° C. for an additional hour. Under $N_2$, the product was separated from the liquid phase and washed with n-hexane until free of unreacted ingredients or by-products. The washing solvent was removed by $N_2$ at <100° C. The final dry product contained 4.0 wt.% titanium.

Evaluation under PB conditions with triisobutylaluminum as cocatalyst showed that it was quite active at 142 g/g cat/hr; under PF conditions and 50 psig hydrogen, activity was high at 1307 g/g cat/hr. Resin melt index was 0.5 g/10 minutes; $R_d$ was 3.1 and Sw was also 3.1, implying narrow molecular weight distribution and low weight swell.

EXAMPLE 6

Under $N_2$, 10 g of silica calcined at 1300° F., having the same physical properties as described in Example 5, was mixed with 60 cc pure n-heptane. With stirring, 16 cc of 10 wt.% BEM in n-heptane was added. The mixture was heated at 90°–100° C. for one hour. Without cooling, 0.9 cc of 1-butanol was added to the mixture. Heating was continued for an additional 0.25 hour. Again without cooling, 4.0 cc of TiCl$_4$ was added. Heating continued for an additional hour at 90°–100° C. Work-up of the product under $N_2$ involved separation, washing with pure hexane, and drying at <100° C. with $N_2$ to give a cream-colored dry product containing 4.1 wt.% titanium.

Reactivity under PB conditions was on the low side at 86 g/g cat/hr as compared to the reactivity of the Example 5 catalyst. Activity under PF conditions was good at 1038 g/g cat/hr with 50 psig hydrogen. Resin melt index was 0.5 g/10 minutes; $R_d$ and Sw were 3.7 and 3.5, respectively, again showing a narrow molecular weight distribution and relatively low weight swell.

EXAMPLE 7

This catalyst was prepared exactly as described in Example 6 except with another type of 1300° F. calcined silica. The silica used had a surface area of 430

$m^2/g$ and a water pore volume of 2.1 cc/g. The final catalyst contained 5.9 wt.% titanium.

The catalyst activated with triisobutylaluminum gave an activity of 132 g/g cat/hr under PB conditions, and a reactivity of 1089 g/g cat/hr under PF conditions. High load melt index was 1.3 with 50 psig hydrogen.

EXAMPLE 8

Another type of silica with surface area of 300 $m^2/g$ and water pore volume of 1.97 cc/g was used to prepare a catalyst as described in Example 5. A catalyst containing 4.3 wt.% titanium was obtained.

Activity under PB conditions was good at 141 g/g cat/hr, but on the low side under PF conditions with 50 psig hydrogen, 333 g/g/ cat/hr. Resin melt index was very high at 56 g/10 minutes.

EXAMPLE 9

In place of a silica, an alumina with surface area of 250 $m^2/g$, water pore volume of 0.55 cc/g, and apparent bulk density of 0.8 g/cc, was used to prepare a near optimum catalyst as follows. Under $N_2$, 20 g of the alumina calcined at 1500° F. was mixed with 120 cc pure n-heptane. Twenty-four cc of 10 wt.% BEM in n-heptane was added to the mixture which was then stirred and heated at 90°-100° C. for one hour. 1-Butanol, 1.2 cc, was then added to the hot mixture. Heating at 90°-100° C. was continued for an additional 0.25 hour after which 1.5 cc of $TiCl_4$ was added followed by continued heating for one hour. The usual work-up gave a dry catalyst containing 3.3 wt.% titanium. Evaluation under PB conditions showed good activity at 147 g/g cat/hr; under PF conditions, activity was fair at 318 g/g cat/hr with 50 psig $H_2$.

EXAMPLE 10

Two hundred g of a 1500° F. calcined alumina with surface area of 371 $m^2/g$; pore volume of 1.8 cc/g; surface hydroxyl concentration of 0.96 mmoles/g and apparent bulk density of 0.28 g/cc was mixed under $N_2$ with 600 cc pure n-heptane. With stirring, 286 cc of 10 wt.% BEM in n-heptane was added. The mixture was heated at 90°-100° C. for one hour. Fourteen cc of 1-butanol was then added to the hot mixture followed by continued heating for 0.5 hour. Then 18 cc of $TiCl_4$ was added and the mixture heated an additional hour at 90°-100° C. The usual work-up provided a product containing 3.2 wt.% titanium and 9.3 wt.% chloride.

Pressure bottle conditions with triisobutylaluminum as cocatalyst revealed a high reactivity of 166 g/g cat/hr; PF evaluation showed an activity of 1821 g/g cat/hr with the same cocatalyst and with 50 psig hydrogen as modifier. High load resin melt index was 0.24.

EXAMPLE 11

Twenty g of the same alumina described in Example 10 was placed under $N_2$, mixed with 29 cc of 10 wt.% BEM in n-heptane and heated for 0.25 hour at 90°-100° C. Then 1.6 cc 1-butanol was added and the mixture stirred and heated for an additional 0.25 hour. Without cooling, 1.8 cc of $TiCl_4$ was added directly into the stirred mixture. The $N_2$ flow was then raised to remove the n-heptane associated with the alkylmagnesium. The final dry product contained 3.0 wt.% titanium.

Evaluation under PB conditions showed a high reactivity of 200 g/g cat/hr with triisobutylaluminum as cocatalyst. Modification with 50 psig $H_2$ under PF conditions showed an activity of 533 g/g cat/hr. Resin melt index was 3.2 g/10 minutes; $R_d$ was 6.6 and Sw was 4.5.

Invention Examples 12 to 17 inclusive illustrate that a variety of pure or mixed hydrocarbyl alcohols can be used but that primary alcohols rather than secondary alcohols are preferred.

EXAMPLE 12

This catalyst has been described by Example 10 and shows that 1-butanol, a primary straight chain aliphatic alcohol, gave a high activity catalyst especially when the preferred concentration of components is used for the particular alumina support.

EXAMPLE 13

A secondary aliphatic alcohol was used to prepare the catalyst of this example. Under $N_2$, 10 g of 1500° F. calcined alumina (described in Example 10) was mixed with 60 cc of pure n-heptane and then with 16 cc 10 wt.% solution of BEM in n-heptane. The mixture was stirred and heated 0.5 hour at 90°-100° C. Without cooling, 0.9 cc of 2-butanol was added and the heating continued for an additional 0.25 hour. Four cc of $TiCl_4$ was then added followed by heating at 90°-100° C. for one hour. The usual work-up gave a catalyst containing 6.8 wt.% titanium.

With triisobutylaluminum as cocatalyst, the catalyst showed an activity of 28 g/g cat/hr, under PB conditions.

EXAMPLE 14

A similar catalyst to Example 13 was prepared with changes only in the concentrations of ingredients. Thus, 20 g of 1500° F. calcined alumina (described in Example 10) was mixed with 120 cc pure n-heptane and 29 cc of 10 wt.% BEM in n-heptane. The mixture was stirred and heated one hour at 90°-100° C. Again without cooling, 1.6 cc 2-butanol was added and allowed to react 0.25 hour followed by the addition of 1.8 cc $TiCl_4$ and and additional one hour of heating. Work-up gave a catalyst containing 2.6 wt.% titanium.

As with the catalyst of Example 13, an activity of 51 g/g cat/hr was observed under PB conditions.

EXAMPLE 15

A mixture of $C_6$, $C_8$, and $C_{10}$ primary straight chain hydrocarbyl alcohols with average molecular weight of 144 was used to prepare this catalyst by the method of Example 14. In place of the 2-butanol, 215 cc of the alcohol mixture was used to produce a catalyst containing 3.2 wt.% titanium.

The catalyst showed good activity at 93 g/g cat/hr under PB conditions and a high activity of 1031 g/g cat/hr with 50 psig $H_2$ under PF conditions. Triisobutylaluminum was the cocatalyst.

EXAMPLE 16

A primary aralkyl alcohol may be substituted for a primary straight chain aliphatic alcohol as shown by this example. The catalyst was prepared by the method of Example 13 except that 1 cc of benzyl alcohol was used in place of 2-butanol to give a catalyst containing 4.8 wt.% titanium.

A high activity of 100 g/g cat/hr was observed under PB conditions; under PF conditions with 20 psig $H_2$, activity was somewhat low at 202 g/g cat/hr.

EXAMPLE 17

Methanol, the lowest molecular weight alcohol, was used in place of 2-butanol in Example 14. The catalyst obtained contained 3.6 wt.% titanium.

High PB activity at 105 g/g cat/hr was attained with triisobutylaluminum as cocatalyst; under PF conditions with 100 psig $H_2$, activity was 201 g/g cat/hr. Resin melt index was high at 14 g/10 minutes.

Examples 18 to 21 inclusive show that the alcohol concentration can be increased to as high as three equivalents to one equivalent of alkylmagnesium without reducing catalyst activity as long as the concentration of $TiCl_4$ added remains greater than the alcohol concentration. Each example was prepared with 1500° F. calcined alumina having the physical properties described in Example 10 and with 1-butanol as the alcohol. Only the concentration of the alcohol was increased; the concentration of $TiCl_4$ remained in excess over the alcohol. Triisobutylaluminum was used as cocatalyst.

EXAMPLE 18

Under $N_2$, 10 g of alumina was mixed with 60 cc pure n-heptane and 16 cc 10 wt.% BEM in n-heptane. The mixture was stirred and heated one hour at 90°–100° C. Then 0.9 cc 1-butanol was added and allowed to react 0.25 hour. While hot, 4 cc $TiCl_4$ was added, the heating continued for an additional hour at 90°–100° C. The usual work-up gave a catalyst containing 4.5 wt.% titanium.

The catalyst showed high activity at 182 g/g cat/hr under PB conditions and 662 g/g cat/hr under PF conditions with 50 psig $H_2$. Resin rheological properties were 0.2 g/10 minutes melt index, 4.5 $R_d$ and 3.8 Sw.

EXAMPLE 19

The catalyst was prepared by the method of Example 18 except 1.4 cc 1-butanol and 3.3 cc $TiCl_4$ were used to give a catalyst containing 7.0 wt.% titanium.

Again, activity was high and nearly identical to that of Example 18 at 181 g/g cat/hr under PB conditions. An activity of 744 g/g cat/hr with 50 psig $H_2$ was attained under PF conditions. Resin properties were 1.0 g/10 minutes melt index, 4.5 $R_d$ and 4.4 Sw.

EXAMPLE 20

Preparation was by the method of Example 18 except that 1.8 cc 1-butanol and 3.3 cc $TiCl_4$ was used to give a catalyst with 6.5 wt.% titanium.

Pressure bottle evaluation again showed a high activity at 226 g/g cat/hr; PF conditions with 50 psig $H_2$ showed high activity at 727 g/g cat/hr. High load melt index of the resin was 2.1 g/10 minutes.

EXAMPLE 21

The final catalyst of this series was again prepared according to Example 18 except that 2.7 cc 1-butanol and 4 cc $TiCl_4$ were used to prepare the catalyst which contained 6.2 wt.% titanium.

Again, a high activity catalyst, 203 g/g cat/hr, was obtained despite the high concentration of 1-butanol. Under PF conditions and 50 psig $H_2$, activity was high at 1422 g/g cat/hr. Resin properties were 0.3 g/10 minutes melt index, 3.3 $R_d$ and 3.4 Sw.

Examples 22 and 23 show that poor activity catalysts are obtained when the alcohol concentration is increased or decreased while the concentrations of ethyl-n-butylmagnesium and $TiCl_4$ remain unchanged for the particular alumina used. Both examples employ 1-butanol. Again, triisobutylaluminum was the cocatalyst.

EXAMPLE 22

Under $N_2$, 20 g of 1500° F. calcined alumina (described in Example 10) was mixed with 120 cc pure n-heptane and 20 cc 10 wt.% BEM in n-heptane. The mixture was stirred and heated at 90°–100° C. for one hour, followed by the addition of 4.9 cc (twofold excess) of 1-butanol. Heating was continued for 0.25 hour followed by the addition of 1.8 cc $TiCl_4$ and continued heating for one hour. Following the usual work-up, a catalyst was obtained which contained 1.7 wt.% titanium.

Activity under PB conditions was very low at 7 g/g cat/hr.

EXAMPLE 23

This catalyst was prepared by the method of Example 22 except for a twofold decrease in the 1-butanol (0.5 cc) concentration.

Again, PB activity was low at 60 g/g cat/hr.

Examples 24 to 26 inclusive show that departure from the preferred concentrations of components for the particular alumina support used (described in Example 10) leads to catalysts with poor activity. The preferred catalyst based on this particular alumina is represented by Example 12 or 29.

EXAMPLE 24

Under $N_2$, 20 g 1500° F. calcined alumina was mixed with 120 cc pure n-heptane and 24 cc 10 wt.% BEM in n-heptane. The mixture was heated and stirred one hour at 90°–100° C. after which 1.2 cc of 1-butanol was added. Heating was continued for 0.25 hour followed by addition of 1.45 cc $TiCl_4$ and continued heating for one hour. The usual work-up gave a catalyst containing 3.9 wt.% titanium.

Evaluation under PB conditions indicated poor activity at 55 g/g cat/hr.

EXAMPLE 25

A similar catalyst was prepared by the method of Example 24 except that 29 cc 10 wt.% BEM in n-heptane, 0.8 cc 1-butanol, and 1.0 cc $TiCl_4$ was used to give a catalyst containing 2.1 wt.% titanium.

Again, activity was low at 16 g/g cat/hr under PB conditions.

EXAMPLE 26

The final catalyst was prepared by the method of Example 24 except 14 cc 10 wt.% BEM in n-heptane, 0.8 cc 1-butanol, and 1.0 cc $TiCl_4$ was used to give a catalyst containing 2.0 wt.% titanium.

Activity under PB conditions was again low at 37 g/g cat/hr.

Examples 27 and 28 represent catalysts which were purposely overloaded with alkylmagnesium, 1-butanol, and $TiCl_4$ simultaneously in terms of the concentration of the alumina support's surface hydroxyl concentration described in Example 10. Although catalyst activity was increased, performance in terms of reactor fouling was poor.

EXAMPLE 27

Under $N_2$, 20 g of 1500° F. calcined alumina was mixed with 120 cc pure n-heptane and 48 cc 10 wt.% BEM in n-heptane. The mixture was stirred and heated for one hour at 90°–100° C. While hot, 2.4 cc 1-butanol was added. Heating continued an additional 0.25 hour. Then 2.9 cc TiCl₄ was added. Heating continued for one hour. The usual work-up gave a catalyst containing 3.4 wt.% titanium.

Evaluation under PB conditions showed a very high activity of 232 g/g cat/hr; under PF conditions with 50 psig $H_2$, activity was 844 g/g cat/hr with reactor fouling. Resin melt index was 0.1 g/10 minutes; $R_d$ and Sw were 3.0 and 3.3 respectively.

EXAMPLE 28

This catalyst was prepared as described by Example 27 except 10 g of alumina, 32 cc 10 wt.% BEM in n-heptane, 1.8 cc 1-butanol, and 8 cc TiCl₄ were used to give a catalyst containing 4.2 wt.% titanium.

Pressure bottle evaluation showed very high activity at 330 g/g cat/hr under PB conditions. The resin produced contained up to 14 wt.% flake resin, suggesting a high potential for reactor fouling.

Examples 29, 30 and 31 illustrate the sensitivity of these catalysts to hydrogen concentration as reflected in the melt index of the resin produced. Example 30 especially shows that under continuous PF reactor conditions in a pilot plant, resin with melt index as high as 30.7 can be produced easily.

EXAMPLE 29

The catalyst was prepared with alumina according to the method of Example 10 except on a smaller scale to give a catalyst containing 2.9 wt.% titanium.

High activity was observed under PB conditions at 178 g/g cat/hr. Testing under PF conditions at varying hydrogen concentrations revealed the following effect on resin melt index:

| Hydrogen Concentration, psig | Resin Melt Index | Catalyst Productivity g/g cat |
|---|---|---|
| None | Less than high load | 2148 |
| 50 | 0.3 high load | 1798 |
| 75 | 3.3 high load | 2765 |
| 100 | 21 | 1250 |
| 100+ | 54 | 1128 |

EXAMPLE 30

This catalyst was prepared with alumina as support on a scale twenty times that of Example 18 for use in a pilot plant continuous particle form reactor to produce high melt index resin. The catalyst contained 9.4 wt.% titanium and 11 wt.% chloride.

Under continuous particle form conditions of 224° F., 1.16 mol% hydrogen, 3.9 wt.% ethylene concentration, and continuously fed triisobutylaluminum as cocatalyst, a productivity level up to 3500 g/g cat was attained. Resin melt index was 30.7 g/10 minutes, bulk density was 29.3, and particle size greater or equal to 60 mesh was 58.5%.

EXAMPLE 31

This example also illustrates the sensitivity of a similar catalyst based on silica to hydrogen concentration as reflected in the melt index of the resin produced. The catalyst was prepared according to Example 5.

| Hydrogen Concentration psig | Resin Melt Index | Catalyst Productivity g/g cat |
|---|---|---|
| None | Less than high load | 3532 |
| 50 | 0.5 | 1960 |
| 75 | 42 | 982 |
| 100 | 92 | 2504 |

Examples 32 to 36 illustrate that melt index control of resulting polymers and copolymers can in part be achieved by adjusting the concentrations of catalyst components on the support while maintaining a constant molar ratio between them. As a result, polymers and copolymers can be produced within a preselected melt index range with minimum hydrogen concentration thus avoiding a reduction in catalyst productivity. Under a given set of polymer synthesis conditions, the catalyst of Example 32 is capable of giving a melt index in the range from fractional high load to about 0.5; Example 34, from fractional high load to about 4; Example 34, from high load to about 23; Example 35, from high load to about 14; Example 36, from fractional to about 7.6.

All catalysts were prepared under $N_2$ in an isobutane media with 1100° F. calcined silica with a surface area of 300 m²/g and a $N_2$ pore volume of 1.7 cc/g, with ethyl-n-butylmagnesium, 1-butanol, and titanium tetrachloride at the concentrations indicated in the Table. The molar ratios of 1-butanol to BEM, TiCl₄ to 1-butanol, and TiCl₄ to BEM were held constant at 0.88, 1 and 0.88 respectively. The final catalysts were dried with $N_2$ at 200°–220° F. Each was then tested under particle form conditions in a one gallon bench scale autoclave with varying hydrogen concentrations. Results are presented in the Table, below.

TABLE

| Example No. | Concentration of Components on support, mmoles/g support | | | Hydrogen Concentration, psig | Catalyst Productivity, g/g catalyst | Resin Melt Index |
|---|---|---|---|---|---|---|
| | BEM | 1-butanol | TiCl₄ | | | |
| 32 | 0.5 | 0.45 | 0.45 | 5 | 1275 | 0.5 high load |
| | | | | 10 | 937 | 1.6 high load |
| | | | | 15 | 678 | 5.5 high load |
| | | | | 20 | 768 | 0.5 |
| 33 | 1.0 | 0.9 | 0.9 | 5 | 1506 | 0.8 high load |
| | | | | 10 | 1563 | 2.8 high load |
| | | | | 15 | 847 | 0.28 |
| | | | | 20 | 509 | 0.58 |
| | | | | 25 | 2584 | 2.4 |
| | | | | 30 | 1941 | 3.9 |
| 34 | 1.5 | 1.32 | 1.32 | 5 | 1896 | 4.4 high load |
| | | | | 10 | 1971 | 0.98 |
| | | | | 15 | 2347 | 1.9 |

TABLE-continued

| Example No. | Concentration of Components on support, mmoles/g support | | | Hydrogen Concentration, psig | Catalyst Productivity, g/g catalyst | Resin Melt Index |
| --- | --- | --- | --- | --- | --- | --- |
| | BEM | 1-butanol | TiCl₄ | | | |
| | | | | 20 | 2083 | 4.8 |
| | | | | 25 | 1312 | 6.4 |
| | | | | 30 | 1373 | 22.8 |
| 35 | 1.8 | 1.58 | 1.58 | 5 | 1703 | 6.4 high load |
| | | | | 10 | 1382 | 1.0 |
| | | | | 15 | 1529 | 4.1 |
| | | | | 20 | 2985 | 7.6 |
| | | | | 25 | 2116 | 13.8 |
| | | | | 30 | 1699 | 10.0 |
| 36 | 2.25 | 2.0 | 2.0 | 5 | 1847 | 0.18 |
| | | | | 10 | 1377 | 0.30 |
| | | | | 15 | 1398 | 1.3 |
| | | | | 20 | 1847 | 2.5 |
| | | | | 25 | 1377 | 3.4 |
| | | | | 30 | 1541 | 7.6 |

EXAMPLE 37

This example illustrates a critical feature of the catalyst preparation. In order to provide a catalyst of high reactivity, the hydrocarbyl alcohol must not be removed from the dialkylmagnesium/support composite prior to reaction of the mixture with a transition metal compound.

Thus, under $N_2$, 200 g of 1300° F. calcined alumina was mixed with 600 cc n-heptane. Three hundred eighteen cc of a 10 wt.% solution of BEM in n-heptane was added. The mixture was stirred and heated for two hours at 90°-100° C. While hot, 55 cc of 1-butanol was added. Heating was continued while the $N_2$ flow was increased in order to completely remove the 1-butanol and n-heptane by evaporation. The product was finally placed under vacuum to insure complete removal of the 1-butanol. The final product was an off-white flowable powder.

A 5 g portion of the product was mixed with 25 cc n-heptane under $N_2$. Exactly 0.25 cc 1-butanol was added and allowed to mix 0.25 hour. One cc titanium tetrachloride was added and the mixture stirred and heated at 90°-100° C. for one hour. After cooling, the slurry was filtered under $N_2$, washed with n-hexane, and dried under $N_2$. Activation of the catalyst containing 4.2 wt.% titanium with triisobutylaluminum in the usual manner gave rise to a poor catalyst under PB conditions. Activity was only 42 g/g cat/hr.

EXAMPLE 38

Completely removing the alcohol, as described in the example above, and not readding it prior to reaction with titanium tetrachloride is illustrated by this example.

Under $N_2$, 170 g of the alcohol-free 1-butanol-treated ethyl-n-butylmagnesium-alumina composite prepared as described in Example 32, was mixed with 1000 cc n-heptane. Thirty-four cc of titanium tetrachloride was added. The mixture was stirred and heated two hours at 95°-100° C., cooled, filtered, washed with n-hexane, and dried under $N_2$. A product containing 3.9 wt.% titanium was obtained.

Activation of this product with triisobutylaluminum led to a poor catalyst as tested under PB conditions. Activity was only 34 g/g cat/hr.

EXAMPLE 39

The effect on catalyst activity as a result of using butoxytitanium trichloride as the titanium source added to the alcohol-free 1-butanol-treated ethyl-n-butylmagnesium on alumina composite prepared as described in Example 32 is illustrated by this example.

To a 5 g portion of the alcohol-free product from Example 32 in 25 cc n-heptane was added an n-heptane solution of the reaction product, 0.45 cc 1-butanol and 0.55 cc titanium tetrachloride. The mixture was stirred under $N_2$ and heated for one hour at 90°-100° C. The mixture was cooled, the product filtered, washed with n-hexane, and dried under $N_2$. The product contained 2.5 wt.% titanium.

The product activated with triisobutylaluminum showed an activity of only 19 g/g cat/hr under PB conditions.

TABLE OF DISCLOSURE EXAMPLES

| Example No. | Support | Type ROH | mmoles/g Support BEM[a] | mmoles/g Support ROH[b] | mmoles/g Support TiCl4 | Molar Ratio ROH/BEM | Molar Ratio TiCl4/ROH | Molar Ratio TiCl4/BEM | Wt.% Ti | PB[c] | Activity[d] g/g cat/hr PF[e](psig H2) | Productivity[d] g/g cat PF[e](psig H2) | Resin Properties[g] MI | Resin Properties[g] R_d | Resin Properties[g] Sw |
|---|---|---|---|---|---|---|---|---|---|---|---|---|---|---|---|
| CONTROL CATALYSTS | | | | | | | | | | | | | | | |
| 1 | 1300° F. SiO2[f] | — | — | — | neat | — | — | — | 3.5 | 20 | — | — | — | — | — |
| 2 | 1300° F. Al2O3[f] | — | — | — | neat | — | — | — | 3.9 | 87 | — | — | — | — | — |
| 3 | 1500° F. Al2O3[f] | — | — | — | 0.8 | — | — | 0.88 | 2.8 | 65 | — | — | — | — | — |
| 4 | " | 1-butanol | — | 0.8 | 0.8 | — | 1 | — | 3.8 | 0 | — | — | — | — | — |
| TYPE OF SUPPORT | | | | | | | | | | | | | | | |
| 5 | 1100° F. SiO2[j] | 1-butanol | 2.25 | 1.98 | 1.98 | 0.88 | 1 | 0.88 | 4.0 | 142 | 1307 (50) | 1960 (50) | 0.5 | 3.1 | 3.8 |
| 6 | 1300° F. SiO2[j] | " | 1 | 1 | 3.6 | 1 | 3.6 | 3.6 | 4.1 | 86 | 1038 (50) | 2075 (50) | 0.5 | 3.7 | 3.5 |
| 7 | 1300° F. SiO2[j] | " | 1 | 1 | 3.6 | 1 | 3.6 | 3.6 | 5.9 | 132 | 1089 (50) | 3268 (50) | 1.3HL | — | — |
| 8 | 1300° F. Al2O3[p] | " | 2.25 | 1.98 | 1.98 | 0.88 | 1 | 0.88 | 4.3 | 141 | 333 (50) | 833 (50) | 56 | — | — |
| 9 | 1500° F. Al2O3[o] | " | 0.75 | 0.66 | 0.66 | 0.88 | 1 | 0.88 | 3.3 | 147 | 318 (50) | 953 (50) | 0.24HL | — | — |
| 10 | 1500° F. Al2O3[f] | " | 0.9 | 0.8 | 0.8 | 0.88 | 1 | 0.88 | 3.2 | 166 | 1821 (50) | 1821 (50) | 0.24HL | 6.6 | — |
| 11 | " | " | 0.9 | 0.8 | 0.8 | 0.88 | 1 | 0.88 | 3.0 | 200 | 533 (50) | 1600 (50) | 3.2 | — | 4.5 |
| TYPE OF ALCOHOL | | | | | | | | | | | | | | | |
| 12 | 1500° F. Al2O3[f] | 1-butanol | 0.9 | 0.8 | 0.8 | 0.88 | 1 | 0.88 | 3.2 | 166 | 1821 (50) | 1821 (50) | 0.24HL | — | — |
| 13 | " | 2-butanol | 1 | 1 | 3.6 | 1 | 3.6 | 3.6 | 6.8 | 28 | — | — | — | — | — |
| 14 | 1500° F. Al2O3[f] | 2-butanol | 0.9 | 0.8 | 0.8 | 0.88 | 1 | 0.88 | 2.6 | 51 | — | — | — | — | — |
| 15 | " | EPAL 610[h] | 0.9 | 0.8 | 0.8 | 0.88 | 1 | 0.88 | 3.2 | 93 | 1031 (50) | 3094 (50) | <HL | — | — |
| 16 | " | benzyl alcohol | 0.9 | 1 | 3.6 | 1 | 3.6 | 3.6 | 4.8 | 100 | 202 (20) | 608 (20) | <HL | — | — |
| 17 | " | methanol | 0.9 | 0.8 | 0.8 | 0.88 | 1 | 0.88 | 3.6 | 105 | 201 (100) | 602 (100) | 14 | — | — |
| INCREASED ALCOHOL CONCENTRATION WITH EXCESS TiCl4 | | | | | | | | | | | | | | | |
| 18 | 1500° F. Al2O3[f] | 1-butanol | 1 | 1 | 3.6 | 1 | 3.6 | 3.6 | 4.5 | 182 | 662 (50) | 1987 (50) | 0.2 | 4.5 | 3.3 |
| 19 | " | " | 1 | 1.5 | 3.0 | 1.5 | 2.0 | 3.0 | 7.0 | 181 | 744 (50) | 1488 (50) | 1.0 | 4.5 | 4.4 |
| 20 | " | " | 1 | 2.0 | 3.0 | 2.0 | 1.5 | 3.0 | 6.4 | 226 | 727 (50) | 2181 (50) | 2.1HL | — | — |
| 21 | " | " | 1 | 3.0 | 3.6 | 3.0 | 1.2 | 3.6 | 6.2 | 203 | 1422 (50) | 4266 (50) | 0.3 | 3.3 | 3.4 |
| VARIABLE ALCOHOL CONCENTRATION | | | | | | | | | | | | | | | |
| 22 | 1500° F. Al2O3[f] | 1-butanol | 0.9 | 2.7 | 0.8 | 3 | 0.3 | 0.88 | 1.7 | 7 | — | — | — | — | — |
| 23 | " | " | 0.9 | 0.3 | 0.8 | 0.33 | 2.7 | 0.88 | 3.1 | 60 | — | — | — | — | — |
| DEPARTURE FROM OPTIMUM COMPONENT CONCENTRATIONS FOR 1500° F. Al2O3[f] | | | | | | | | | | | | | | | |
| 24 | 1500° F. Al2O3[f] | 1-butanol | 0.75 | 0.66 | 0.66 | 0.88 | 1 | 0.88 | 3.9 | 55 | 2148 (none) | 2148 (none) | <HL | — | — |
| | | | | | | | | | | | 1199 (50) | 1798 (50) | 0.3HL | — | — |
| 25 | " | " | 0.9 | 0.45 | 0.45 | 0.5 | 1 | 0.5 | 2.1 | 16 | 922 (75) | 2765 (75) | 3.3HL | — | — |
| 26 | " | " | 0.45 | 0.45 | 0.45 | 1 | 1 | 1 | 2.0 | 37 | 416 (100) | 1250 (100) | 21 | — | — |
| | | | | | | | | | | | 376 (100+) | 1128 (100+)[k] | 54 | — | — |
| HIGH LOADING CATALYSTS | | | | | | | | | | | | | | | |
| 27 | 1500° F. Al2O3[f] | 1-butanol | 1.5 | 1.3 | 1.3 | 0.88 | 1 | 0.88 | 3.4 | 232 | 844 (50) | 2531 (50) | 0.1 | 3.0 | 3.3 |
| 28 | " | " | 2.0 | 2.0 | 7.2 | 1 | 7.2 | 7.2 | 4.2 | 330 | 755 (50) | 2266 (50) | 3.9HL | 4.7 | 4.3 |
| MELT INDEX VERSUS HYDROGEN CONCENTRATION | | | | | | | | | | | | | | | |
| 29 | 1500° F. Al2O3[f] | 1-butanol | 0.9 | 0.8 | 0.8 | 0.88 | 1 | 0.88 | 2.9 | 178 | — | 3500 (H2)[k] | 30.7 | — | — |
| | | | | | | | | | | | — | 3532 (none) | <HL | — | — |
| 30[k] | " | " | 1.0 | 1.0 | 3.6 | 1 | 3.6 | 3.6 | 9.4 | 174 | 1177 (none) | 1960 (50) | 0.5 | 3.1 | 3.1 |
| 31 | 1100° F. SiO2[j] | " | 2.25 | 1.98 | 1.98 | 0.88 | 1 | 0.88 | 4.0 | 142 | 1307 (50) | 982 (75) | 42 | — | — |
| | | | | | | | | | | | 1252 (100) | 1252 (100) | 92 | — | — |

MELT INDEX VERSUS HYDROGEN CONCENTRATION, MELT INDEX CONTROL

TABLE OF DISCLOSURE EXAMPLES-continued

| Example No. | Type Support | ROH | mmoles/g Support BEM[a] | ROH[b] | TiCl4 | Molar Ratio ROH/ BEM | TiCl4/ ROH | TiCl4/ BEM | Wt.% Ti | PB[c] | Activity[d] g/g cat/hr PF[e](psig H2) | Productivity[d] g/g cat PF[e](psig H2) | Polyethylene Resin Properties[g] MI | R[d] | Sw |
|---|---|---|---|---|---|---|---|---|---|---|---|---|---|---|---|
| 32 | 1100° F. SiO2[j] | 1-butanol | 0.5 | 0.45 | 0.45 | 0.88 | 1 | 0.88 | 1.8 | 45 | 392 (5)<br>312 (10)<br>226 (15)<br>153 (20) | 1275 (5)<br>937 (10)<br>678 (15)<br>768 (20) | 0.5HL<br>1.6HL<br>5.5HL<br>0.5 | — | — |
| 33 | 1100° F. SiO2[j] | 1-butanol | 1.0 | 0.9 | 0.9 | 0.88 | 1 | 0.88 | 3.3 | 50 | 1205 (5)<br>1348 (10)<br>847 (15)<br>509 (20)<br>861 (25)<br>597 (30) | 1506 (5)<br>1563 (10)<br>847 (15)<br>509 (20)<br>2584 (25)<br>1941 (30) | 0.8HL<br>2.8HL<br>0.28<br>0.58<br>2.4<br>3.9 | 2.3 | 2.4 |
| 34 | " | " | 1.5 | 1.32 | 1.32 | 0.88 | 1 | 0.88 | 4.6 | 224 | 632 (5)<br>606 (10)<br>782 (15)<br>694 (20)<br>437 (25)<br>289 (30) | 1896 (5)<br>1971 (10)<br>2347 (15)<br>2083 (20)<br>1312 (25)<br>1373 (30) | 4.4HL<br>0.98<br>1.9<br>4.8<br>6.4<br>22.8 | 4.0 | 2.8 |
| 35 | " | " | 1.8 | 1.58 | 1.58 | 0.88 | 1 | 0.88 | 3.6 | 37 | 851 (15)<br>460 (10)<br>382 (15)<br>995 (20)<br>705 (25)<br>425 (30) | 1703 (5)<br>1382 (10)<br>1529 (15)<br>2985 (20)<br>2116 (25)<br>425 (30) | 6.4HL<br>1.1<br>4.1<br>7.6<br>10.0<br>13.6 | 2.3 | — |
| 36 | " | " | 2.25 | 2.0 | 2.0 | 0.88 | 1 | 0.88 | 5.8 | 288 | 616 (5)<br>459 (10)<br>466 (15)<br>616 (20)<br>459 (25)<br>308 (30) | 1847 (5)<br>1377 (10)<br>1398 (15)<br>1847 (20)<br>1377 (25)<br>1541 (30) | 0.18<br>0.3<br>1.3<br>2.5<br>3.4<br>7.6 | 4.2 | 3.0 |

ALCOHOL REMOVAL PRIOR TO TiCl4

| Example No. | Type Support | ROH | mmoles/g Support BEM[a] | ROH[b] | TiCl4 | Molar Ratio ROH/ BEM | TiCl4/ ROH | TiCl4/ BEM | Wt.% Ti | PB[c] | Activity | Productivity | MI | R[d] | Sw |
|---|---|---|---|---|---|---|---|---|---|---|---|---|---|---|---|
| 37 | 1300° F. Al2O3[f] | 1-butanol | 1 | 1 + 0.5[l] | 1.8 | 1.5 | 1.2 | 1.8 | 4.2 | 42 | — | — | — | — | — |
| 38 | " | " | 1 | 1[m] | 3.6 | 1 | 3.6 | 3.6 | 3.9 | 34 | — | — | — | — | — |
| 39 | " | " | 1 | 1[n] | 1 | 1 | 1 | 1 | 2.5 | 19 | — | — | — | — | — |

FOOTNOTES TO TABLE

[a] Ethyl-n-butylmagnesium
[b] Hydrocarbyl alcohol
[c] Pressure bottle conditions: 500 cc n-heptane, 35 psig ethylene pressure fed on demand and 140° F.
[d] Triisobutylaluminum used as cocatalyst
[e] Particle form conditions: 2900 cc isobutane, 550 psig total pressure, and 220° F.
[f] Surface area, 371 m$^2$/g; H$_2$O pore volume, 1.8 cc/g; surface hydroxyl concentration, 0.96 mmoles/g
[g] R$_d$ is a measure of the molecular weight distribution as defined by M. Shida and L. V. Cancio, Polymer Engineering and Science, March, 1971, Vol. II, No. 2; Sw is weight swell as defined by Cancio, L. V., and Joyner, R. S., Modern Plastics, January, 1977. MI is melt index determined according to ASTM D1238-62, condition F.
[h] A mixture of 3.3 wt. % 1-hexanol, 42.5 wt. % 1-octanol, and 53.8 wt. % 1-decanol
[i] Surface area, 300 m$^2$/g; N$_2$ pore volume, 1.7 cc/g
[j] Surface area, 420 m$^2$/g; H$_2$O pore volume, 2.1 cc/g
[k] Continuous particle form conditions of 224° F., 1.16 mol % hydrogen, 3.9 wt. % ethylene concentration, and continuously fed triisobutylaluminum as cocatalyst. Resin melt index was 30.7 g/10 minutes, bulk density was 29.3, and resin particle size greater or equal to 60 mesh was 58.5%.
[l] Alcohol totally removed and then readded prior to TiCl4
[m] Alcohol totally removed and not readded prior to reaction with TiCl4
[n] n-Butoxytitanium trichloride was added to the alcohol-free composite
[o] Surface area, 300 m$^2$/g; N$_2$ pore volume, 1.97 cc/g
[p] Surface area, 250 m$^2$/g; H$_2$O pore volume, 0.55 cc/g

I claim:
1. A catalyst prepared by the method comprising:
   (1) reacting a finely divided, difficultly reducible, porous support with
   (2) a Group IIA organometallic compound essentially free of aluminum alkyls, then reacting the resulting product with
   (3) water or a hydrocarbyl alcohol in a molar ratio to the compound of step (2) of from 0.5 to 1 to 4 to 1, then reacting the product of this with
   (4) a Group IVB and/or VB transition metal halide or oxyhalide,
   (5) removing essentially all unreacted components and by-products from the reactions of steps (1), (2), (3) and (4), followed by
   (6) activating the resulting reaction product by treating in the substantial absence of air with a cocatalyst that is either hydrogen or a Group IA, IIA, IIIA or IIB organometallic compound or mixture of two or more of these.

2. The catalyst of claim 1 wherein said support is silica, alumina, zirconia, thoria or magnesia or a mixture of two or more of these.

3. The catalyst of claim 1 wherein said compound of (2) is essentially $MR_2$ in which M is beryllium, magnesium, calcium, strontium, barium or mixtures of these and R is hydrogen or a hydrocarbyl radical.

4. The catalyst of claim 3 wherein said organometallic compound of (2) is a dialkylmagnesium.

5. The catalyst of claim 4 wherein said organometallic compound of (2) is dimethylmagnesium.

6. The catalyst of claim 4 wherein said organometallic compound of (2) is ethyl-n-butylmagnesium.

7. The catalyst of claim 4 wherein said organometallic compound of (2) is di-n-hexylmagnesium.

8. The catalyst of claim 4 wherein said organometallic compound of (2) is n-butyl-s-butylmagnesium.

9. The catalyst of claim 1 wherein said support is calcined, the organometallic compound of (2) is a dialkylmagnesium at a molar concentration equal to about 0.25-3 times the molar concentration of the surface hydroxyls on the calcined porous support.

10. The catalyst of claim 8 wherein said reaction is conducted in a liquid hydrocarbon slurry at a temperature between ambient and about 150° C., said hydrocarbon having from about 4 to 8 carbon atoms.

11. The catalyst of claim 10 wherein said temperature is about 90°-100° C.

12. The catalyst of claim 1 wherein the hydrocarbyl alcohol of (3) is of the formula ROH in which R is an alkyl, aryl, alkaryl or aralkyl, each having 1-20 carbon atoms.

13. The catalyst of claim 1 wherein the reaction of step (3) is at an elevated temperature of about 90°-100° C.

14. The catalyst of claim 1 wherein the reaction of step (4) is in a molar ratio of Group IVB or VB transition metal halide or oxyhalide to the alkylmagnesium compound reaction product of step (3) of from 0.5 to about 4 to 1.

15. The catalyst of claim 1 wherein the reaction of step (4) is in a molar ratio of Group IVB or VB transition metal halide or oxyhalide to water or hydrocarbyl alcohol of from about 1-10 to 1.

16. The catalyst of claim 15 wherein said reaction is conducted in a liquid hydrocarbon slurry and at a temperature of about 90°-150° C.

17. The catalyst of claim 16 wherein said temperature is about 90°-135° C.

18. The catalyst of claim 1 wherein said reacted components and by-products are removed by washing with a dry hydrocarbon liquid or gas at temperatures from ambient to about 150° C.

19. The catalyst of claim 18 wherein the upper temperature limit is less than about 100° C.

20. The catalyst of claim 1 wherein said cocatalyst of step (6) comprises hydrogen.

21. The catalyst of claim 1 wherein said cocatalyst of step (6) is present in a molar ratio to the titanium tetrachloride of step (4) of about 0.1-10 to 1.

22. The catalyst of claim 21 wherein said molar ratio is about 3:1.

23. The method of preparing an active polymerizing catalyst comprising:
   (1) reacting a finely divided, difficulty reducible, porous support with
   (2) a Group IIA organometallic compound essentially free of aluminum alkyls, then reacting the resulting product with
   (3) water or a hydrocarbyl alcohol in a molar ratio to the compound of step (2) of from 0.5 to 1 to 4 to 1, then reacting the product of this with
   (4) a Group IVB and/or VB transition metal halide or oxyhalide,
   (5) removing essentially all unreacted components and by-products from the reactions of steps (1), (2), (3) and (4), followed by
   (6) activating the resulting reaction product by treating in the substantial absence of air with a cocatalyst that is either hydrogen or a Group IA, IIA, IIIA or IIB organometallic compound or mixture of two or more of these.

24. The method of claim 23 wherein said support is silica, alumina, zirconia, thoria or magnesia or a mixture of two or more of these.

25. The method of claim 23 wherein said compound of (2) is essentially $MR_2$ in which M is beryllium, magnesium, calcium, strontium, barium or mixtures of these and R is hydrogen or a hydrocarbyl radical.

26. The method of claim 25 wherein said organometallic compound of (2) is a dialkylmagnesium.

27. The method of claim 26 wherein said organometallic compound of (2) is dimethylmagnesium.

28. The method of claim 26 wherein said organometallic compound of (2) is ethyl-n-butylmagnesium.

29. The method of claim 26 wherein said organometallic compound of (2) is di-n-hexylmagnesium.

30. The method of claim 26 wherein said organometallic compound of (2) is n-butyl-s-butylmagnesium.

31. The method of claim 23 wherein said support is calcined, the organometallic compound of (2) is a dialkylmagnesium at a concentration equal to 0.25 up to 3 times the molar concentration of the surface hydroxyls on the calcined support.

32. The method of claim 31 wherein said reaction is conducted in a liquid hydrocarbon slurry at a temperature between ambient and about 150° C., said hydrocarbon having from about 4 to 8 carbon atoms.

33. The method of claim 32 wherein said temperature is about 90°-100° C.

34. The method of claim 23 wherein the hydrocarbyl alcohol of (3) is of the formula ROH in which R is an alkyl, aryl, alkaryl or aralkyl, each having 1-20 carbon atoms.

35. The method of claim 23 wherein the reaction of step (3) is at an elevated temperature of about 90°–100° C.

36. The method of claim 23 wherein the reaction of step (4) is in a molar ratio of Group IVB or VB transition metal halide or oxyhalide to the alkylmagnesium compound reaction product of step (3) of from 0.5 to about 4 to 1.

37. The method of claim 23 wherein the reaction of step (4) is in a molar ratio of Group IVB or VB transition metal halide or oxyhalide to water or hydrocarbyl alcohol of from about 1–10 to 1.

38. The method of claim 36 wherein said reaction is conducted in a liquid hydrocarbon slurry and at a temperature of about 90°–150° C.

39. The method of claim 38 wherein said temperature is about 90°–135° C.

40. The method of claim 23 wherein said reacted components and by-products are removed by washing with a dry hydrocarbon liquid or gas at temperatures from ambient to about 150° C.

41. The method of claim 40 wherein the upper temperature limit is less than about 100° C.

42. The method of claim 23 wherein said cocatalyst of step (6) comprises hydrogen.

43. The method of claim 23 wherein said cocatalyst of step (6) is present in a molar ratio to the titanium tetrachloride of step (4) of about 0.1–10 to 1.

44. The method of claim 43 wherein said molar ratio is about 3:1.

* * * * *